(12) United States Patent
Puscar et al.

(10) Patent No.: US 6,959,295 B1
(45) Date of Patent: Oct. 25, 2005

(54) SYSTEM AND METHOD FOR PROVIDING NEWS UPDATES

(76) Inventors: Michael A. Puscar, 517 Britton Dr., King of Prussia, PA (US) 19406; Michael A. Lentowski, 909 Parkvien Dr., Phoenixville, PA (US) 19460; Andrea Michalek, 1062 Kingscote Dr., Harleysville, PA (US) 19438

( * ) Notice: Subject to any disclaimer, the term of this patent is extended or adjusted under 35 U.S.C. 154(b) by 158 days.

(21) Appl. No.: 09/607,879

(22) Filed: Jun. 30, 2000

(51) Int. Cl.⁷ .......................... G06F 7/00; G06F 17/00
(52) U.S. Cl. .......................... 707/3; 707/2; 707/10
(58) Field of Search .......................... 707/3, 101, 10, 707/2; 379/900; 702/2

(56) References Cited

U.S. PATENT DOCUMENTS

| | | | | |
|---|---|---|---|---|
| 6,061,057 A | * | 5/2000 | Knowlton et al. | 345/744 |
| 6,078,866 A | * | 6/2000 | Buck et al. | 702/2 |
| 6,078,924 A | * | 6/2000 | Ainsbury et al. | 707/101 |
| 6,199,082 B1 | * | 3/2001 | Ferrel et al. | 715/522 |
| 6,233,618 B1 | * | 5/2001 | Shannon | 709/229 |
| 6,339,644 B1 | * | 1/2002 | O'Neil et al. | 379/900 |
| 6,501,832 B1 | * | 12/2002 | Saylor et al. | 379/88.04 |
| 6,546,387 B1 | * | 4/2003 | Triggs | 707/5 |
| 6,553,367 B2 | * | 4/2003 | Horovitz et al. | 707/2 |

OTHER PUBLICATIONS

Sergey et al. "The Anatomy of a large-scale hypertextual web search engine", 7th International World Wide Web conference, Brisbane, Qld. Australia, 14-18 Apr. 1998, in Computer-Networks and ISDN-systems (Netherlands), vol. 30, no. 1-7, p. 107-17, April 1998.*

* cited by examiner

*Primary Examiner*—Frantz Coby
*Assistant Examiner*—Cindy Nguyen
(74) *Attorney, Agent, or Firm*—Morgan, Lewis & Bockius LLP

(57) ABSTRACT

A system and method for providing news relating to a specified subject to a subscriber, wherein a plurality of Web sites relating to a category to which the specified subject relates is selected, the relevancy of at least one Web page in each selected Web site is determined by scanning for words relating to the specified subject, the content type of at least one Web page in each selected Web site is determined by scanning for words indicating content type, a list of relevant Web pages is compiled based on the determinations of relevancy and content type, and the compiled list is provided to the subscriber.

16 Claims, 3 Drawing Sheets

SYSTEM AND METHOD FOR PROVIDING NEWS UPDATES

FIELD OF THE INVENTION

The present invention relates generally to the provision of content updates relating to specified subjects. More particularly, the present invention relates to the provision of updates of content appearing on the World Wide Web (hereinafter "Web") relating to specific subjects.

BACKGROUND

A user of the Web typically gathers news about a subject of particular interest by actively searching the Web for relevant news items. Such a search is very time consuming and typically retrieves both desired news articles and undesired content containing common search terms. Structuring a search so as avoid unwanted content without severely limiting the breadth of the search is typically difficult if not impossible.

Alternatively, the user may sequentially browse a collection of Web sites known to him or her to be possible sources of news items relating to the subject of interest. However, the user will need to search or browse each Web site separately and will not retrieve news items present only on other Web sites.

What is needed is an automated tool for retrieving timely news articles about a subject of interest, without also retrieving unwanted content, from a wide variety of relevant Web sites.

It is therefore an object of the present invention to provide a system and method for providing items, other than advertisements, about a subject of interest to an individual.

SUMMARY OF THE INVENTION

A system and method are provided for providing news relating to a specified subject to a subscriber, wherein a plurality of Web sites relating to a category to which the specified subject relates is selected, the relevancy of at least one Web page in each selected Web site is determined by scanning for words relating to the specified subject, the content type of at least one Web page in each selected Web site is determined by scanning for words indicating content type, a list of relevant Web pages is compiled based on the determinations of relevancy and content type, and the compiled list is provided to the subscriber.

DETAILED DESCRIPTION OF THE PREFERRED EMBODIMENTS

Figure 1:
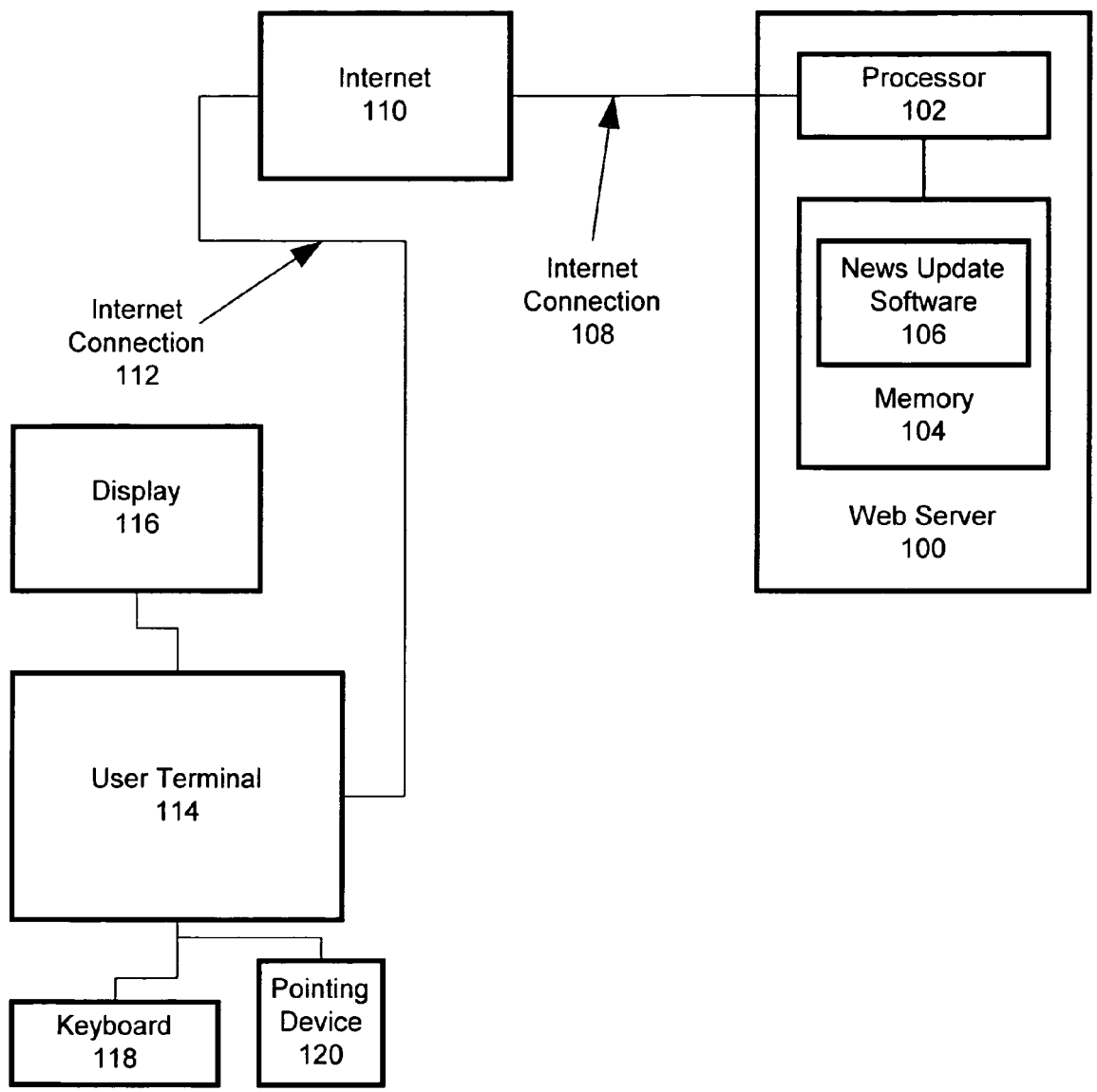
FIG. 1 is a block diagram of a system in accordance with a preferred embodiment of the present invention.

Referring to FIG. 1, a preferred embodiment of a system in accordance with the present invention is illustrated. Web server 100 may be a mainframe, minicomputer, microcomputer, or other type of computer (or may be composed of a plurality of computers connected by a network or other means), but is preferably a Windows NT or Unix server, including at least processor 102, such as a Pentium family processor, and memory 104 connected thereto. Memory 104 may be temporary memory, such as random access memory, or permanent storage, such as a hard drive, but is preferably a combination of temporary memory and permanent storage. News Update software 106, stored in memory 104, in a first preferred embodiment is written in Perl and JAVA and uses a regular expression algorithm to descramble universal resource locators (URLs) located in target Web pages and to identify specific elements pertaining to a particular subject. Once these elements are identified, a string parser breaks the target down into tokens and, based on the frequency of each token, categorizes the document accordingly.

Web server 100 is connected by Internet connection 108 to the Internet 110. User terminal 114 is similarly connected to the Internet 110 by Internet connection 112. Internet connections 108 and 112 may be direct connections, such as T-1 lines or indirect connections, such as modem-to-modem connections over telephone lines, or any other sort of connection to the Internet, and Internet connections 108 and 112 may be of different types.

User terminal 114 may be a dumb terminal or a computer, such as a mainframe computer, a minicomputer, a desktop or laptop microcomputer, a personal digital assistant, or a smartphone. User terminal 114 is most typically a personal computer with a Pentium family processor running a Windows operating system. User terminal 114 is connected to display 116, which may be a cathode ray tube or liquid crystal display monitor, although in some cases user terminal 114 may be integrated with display 116 in a single unit. User terminal 114 is also connected to at least one of keyboard 118 and pointing device 120, which may be a mouse or trackball. In some cases keyboard 118 and pointing device 120 may also be integrated into user terminal 114.

Figure 2:
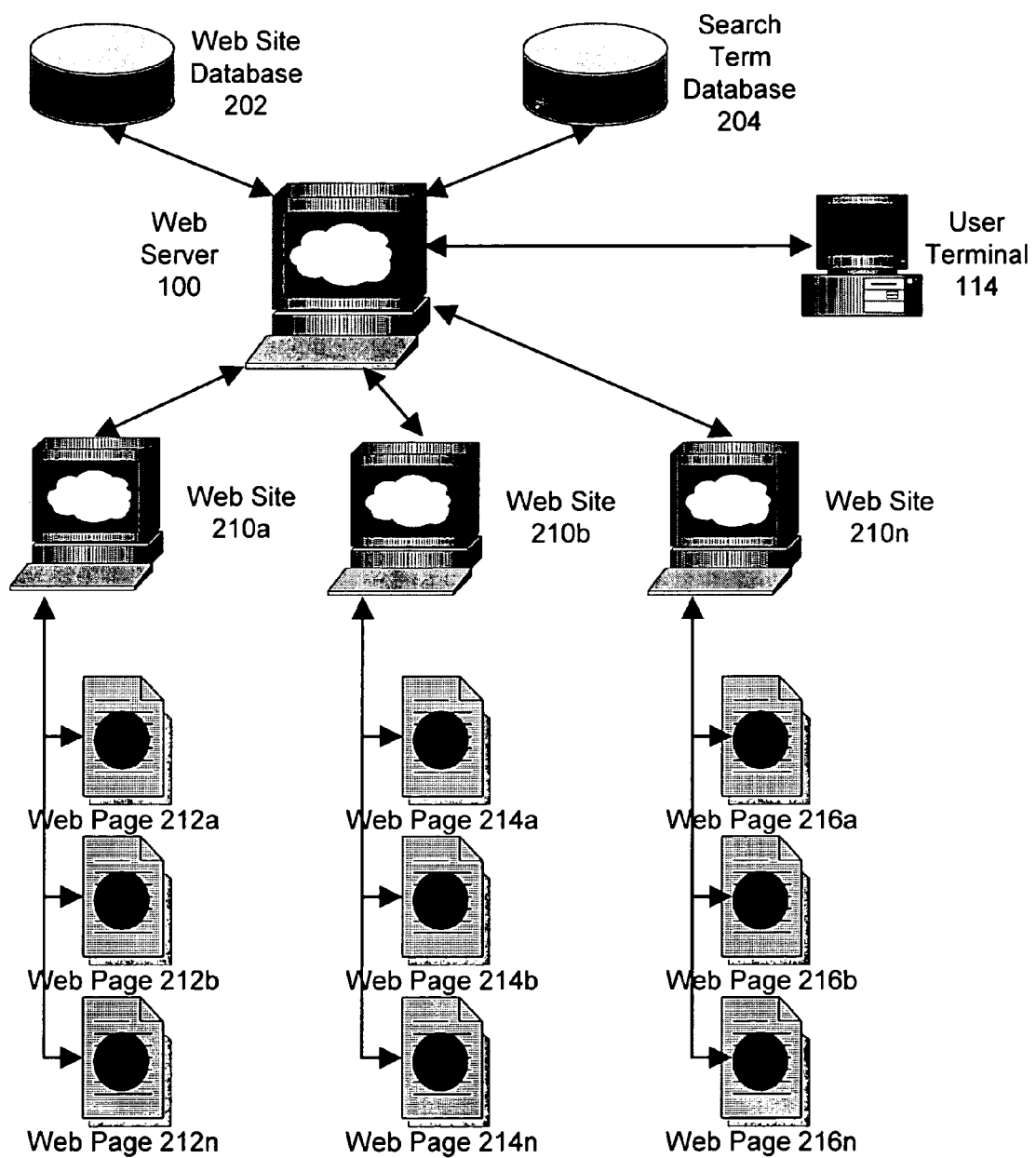
FIG. 2 illustrates the flow of data among computers in accordance with a preferred embodiment of the present invention.

Referring to FIG. 2, in the preferred embodiments of the present invention, a user submits a search request, as described below in connection with FIG. 3, from user terminal 114 to Web server 100, which accesses Web site database 202 and search term database 204 in response to the request. Web site database 202 and search term database 204 may be relational, object oriented, or other custom or commercial off-the-shelf databases, such as Oracle version 8.

Web site database 202 contains entries for each Web site that may be searched in accordance with the method described below in connection with FIG. 3 indicating the category or categories to which such Web site pertains. The categories may be categories such as sports, music, politics, fashion, or technology, may be geographically-based categories (e.g., New York, Mid-West, Europe, etc.), may be based on age, gender, ethnicity, religion, vocation, or avocation, or may be based on a combination of any or all of such categories. Moreover, a category may be very general, such as music or sports, or very specific, such as Madonna or Troy Aikman. As described below, this table may be created manually or automatically.

Search term database 204 may contain search terms relating to categories, to particular subjects within categories, or to both. For example, search term database 204 might contain terms useful in searching for articles on sports, terms useful in searching for articles on American football, terms useful for searching for articles on a particular football team, or some combination of such types of terms.

After formulating a search, as described below in connection with FIG. 3, Web server 100 searches a plurality of Web sites 210a through 210n based on the contents of Web site database 202. Within each of the n Web sites, at least one Web page is searched 212a through 212n, 214a through 214n, or 216a through 216n respectively, using search terms drawn from search term database 204 or from the user (or some combination of such terms). The results are then returned to user terminal 114.

Figure 3:
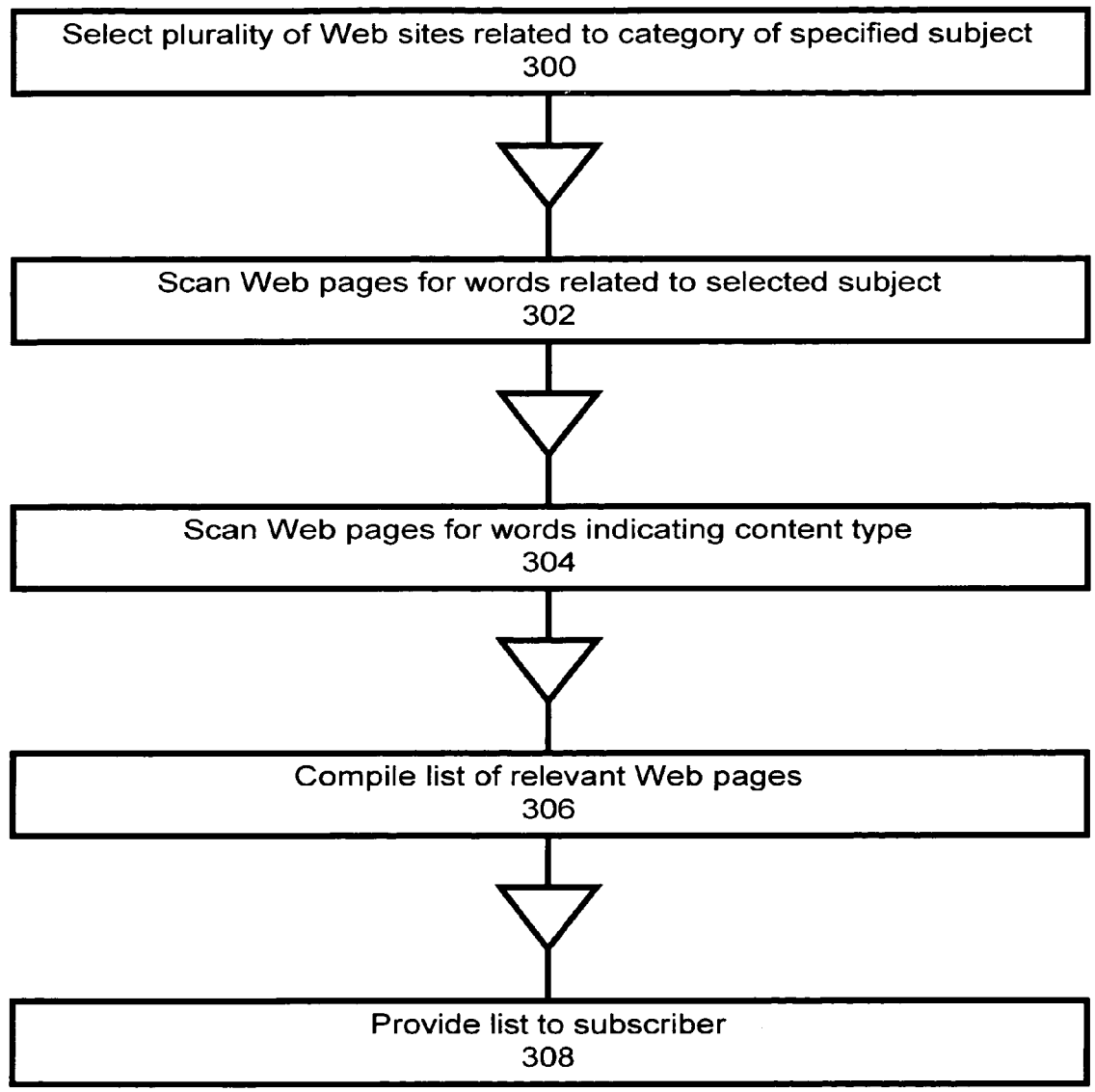
FIG. 3 is a flow chart of a method in accordance with a preferred embodiment of the present invention.

Referring to FIG. 3, a method in accordance with a preferred embodiment of the present invention is illustrated. In the preferred embodiments hereunder, as a part of step 300, before the performance of step 300, or after the performance of step 300, in at least the first iteration of the present method with respect to a particular user, the user is prompted to provide a subject about which the user desires to receive news articles (or other non-advertising content) or references to news articles (or other non-advertising content). The user may be so prompted by displaying a message on a Web page requesting that the user specify a subject and providing the user with a text entry box or a drop-down list box for supplying the subject, or the user may be provided with the opportunity to navigate through a pre-indexed Web site with hyperlinks to popular subjects. The user may also be so prompted by an e-mail message prompting the user to reply by e-mail with the desired subject (in the header or body of the message) or by other means. In other embodiments of the present invention, the user may not be prompted to provide a subject at all. For example, in an embodiment directed to the employees of a particular corporation, the employees might automatically receive content relating to the corporation or relating to their job functions. Similarly, members of a professional, recreational, or political organization might automatically receive content relating to the organization or subject matter related to such organization.

The user may also be prompted to select a category into which the subject falls from a predetermined list of categories. Alternatively, the news update software may categorize the subject automatically from stored subject category combinations (e.g., New York Giants/Sports, C++/Technology, AARP/Senior Citizens) or the administrator of the news update service may categorize the subject manually.

In addition, the user may optionally be prompted to select search terms to be used by the news update software. Preferably, the user is first presented with a list of search terms that the news update software will use by default and the user is then offered the opportunity to add or delete terms from the list. Alternatively, the news update software can rely on the user to provide all search terms or can automatically use the default terms in each case.

In step 300, a plurality of Web sites relating to the category to which the specified subject relates is selected. This plurality may be selected by accessing Web site database 202 and retrieving a set of Web sites pertaining to the same category to which the specified subject relates. In other embodiments, the user may be prompted to supply, or modify, the list of Web sites, or the list may be determined manually by the news update software administrator. In any event, if the method has previously been performed with respect to a particular user with respect to the same subject, only Web sites containing content that has been altered since the last performance of the method with respect to the user with respect to the same subject are selected.

In step 302, Web pages and URL's are scanned for words relating to the selected subject. As described above, a set of search terms retrieved from search term database 204 or supplied by the user may be used in this step. Alternatively, or in addition, the words constituting the subject (e.g., "New York Giants") may be utilized as the search terms. The Web pages that are scanned include at least one Web page from each Web site selected in step 300. Preferably, the index page of each selected Web site possessing an index page is scanned and all Web pages of each selected Web site not possessing an index page are scanned. However, if the present method has been previously performed with respect to a particular user with respect to the same subject, only Web pages that have been altered since the last such performance are scanned. In a first preferred embodiment, each Web page containing at least one mention of at least one search term is determined to be relevant based on this scanning. In a second preferred embodiment, a predetermined number of total mentions of all search terms within a Web page is required for the Web page to be determined to be relevant.

In step 304, in a preferred embodiment, each Web page determined to be relevant in step 302 is scanned for words indicating the content type of the Web page (e.g., advertising or news). In another preferred embodiment, each Web page may be simultaneously scanned both for words relating to the specified subject and for words indicating content type. Alternatively, all Web pages in Web sites that have been categorized may be scanned for words indicating the content type of the Web page prior to the performance of any of the steps of the present method. In any event, the content type of a Web page may be determined to be a particular type based on a single occurrence of a word for which the Web page is scanned, based on the occurrence of a predetermined number of such words, or based on the proportion of words suggesting a particular content type to words suggesting another (or all other) content type or types.

In step 306, a list of relevant Web pages is compiled. Preferably, the list consists of all Web pages determined to relate to the selected subject based on the results of step 302 and also determined to be of an appropriate content type (e.g., news or all content other than advertising) based on the results of step 304.

In step 308, this list is provided to the subscriber (or other user in other embodiments of the present invention). The list may be displayed on a Web site, or sent by e-mail, ordinary mail, facsimile, an HTML or XML feed, beeper, cell phone, or other means, but is preferably sent by e-mail to the user. The list includes at least the uniform resource locator (hereinafter the "URL") of each Web page in the list and may also include the date on which each Web page was last modified, the title of the document, and the publication source.

Optionally, feedback may be utilized to improve the accuracy or speed of the present method. For example, Web sites whose Web pages consistently fail to generate any hits in step 302 or consistently are categorized as being of an inappropriate content type (such as advertising) may be omitted from subsequent iterations of the present method with respect to a particular subject or a particular user. Furthermore, the user may be prompted to supply feedback indicating whether each Web page in the list provided to the user in step 308 is actually relevant. Based on such feedback Web sites may be recharacterized or search terms may be altered with respect to the particular user or subject or with respect to all users or subjects.

The present invention may be embodied in other specific forms without departing from the spirit or essential attributes of the invention. Accordingly, reference should be made to the appended claims, rather than the foregoing specification, as indicating the scope of the invention.

That which is claimed is:

1. A computer implemented method of providing news relating to a specified subject to a subscriber, comprising the steps of:
    (a) selecting a plurality of Web sites operated by content providers and relating to a category to which the specified subject relates;
    (b) automatically determining the relevancy of at least one Web page in each selected Web site by scanning at least one Web page for words relating to the specified subject;
    (c) automatically determining the content type of at least one Web page in each selected Web site by scanning at least one Web page for words indicating content type;
    (d) compiling a list of relevant Web pages based on the results of steps (b) and (c), wherein the list of relevant Web pages includes only those Web pages that are determined both to be relevant in step (b) and to be of a news content type in step (c), wherein the compiled list includes hyperlinks to the relevant Web pages; and
    (e) providing the compiled list to the subscriber, wherein the subscriber is a party other than one of said content providers, wherein the providing comprises transmitting the compiled list from a Web server to the subscriber over the Internet.

2. A computer implemented method of providing news relating to a specified subject to a subscriber, comprising the steps of:
    (a) selecting a plurality of Web sites operated by content providers and relating to a category to which the specified subject relates;
    (b) automatically determining the relevancy of at least one Web page in each selected Web site by scanning at least one Web page for words relating to the specified subject;
    (c) automatically determining the content type of at least one Web page in each selected Web site by scanning at least one Web page for words indicating content type;
    (d) compiling a list of relevant Web pages based on the results of steps (b) and (c), wherein the list of relevant Web pages includes only those Web pages that are determined both to be relevant in step (b) and not to be advertisements in step (c), wherein the compiled list includes hyperlinks to the relevant Web pages; and
    (e) providing the compiled list to the subscriber, wherein the subscriber is a party other than one of said content providers, wherein the providing comprises transmitting the compiled list from a Web server to the subscriber over the Internet.

3. A computer implemented method of providing news relating to a specified subject to a subscriber, comprising the steps of:
    (a) selecting a plurality of Web sites operated by content providers and relating to a category to which the specified subject relates, wherein the plurality of Web sites is selected based on the frequency with which relevant links have been located in prior iterations of the method with respect to the specified subject;
    (b) automatically determining the relevancy of at least one Web page in each selected Web site by scanning at least one Web page for words relating to the specified subject;
    (c) automatically determining the content type of at least one Web page in each selected Web site by scanning at least one Web page for words indicating content type;
    (d) compiling a list of relevant Web pages based on the results of steps (b) and (c), wherein the complied list includes hyperlinks to the relevant Web pages; and
    (e) providing the compiled list to the subscriber, wherein the subscriber is a party other than one of said content providers, wherein the providing comprises transmitting the compiled list from a Web server to the subscriber over the Internet.

4. A computer implemented method of providing news relating to a specified subject to a subscriber, comprising the steps of:
    (a) selecting a plurality of Web sites operated by content providers and relating to a category to which the specified subject relates, wherein the plurality of Web sites is selected based on the frequency with which relevant links have been located in prior iterations of the method with respect to the same category;
    (b) automatically determining the relevancy of at least one Web page in each selected Web site by scanning at least one Web page for words relating to the specified subject;
    (c) automatically determining the content type of at least one Web page in each selected Web site by scanning at least one Web page for words indicating content type;
    (d) compiling a list of relevant Web pages based on the results of steps (b) and (c), wherein the complied list includes hyperlinks to the relevant Web pages; and
    (e) providing the compiled list to the subscriber, wherein the subscriber is a party other than one of said content providers, wherein the providing comprises transmitting the compiled list from a Web server to the subscriber over the Internet.

5. A computer-readable medium tangibly embodying instructions which, when executed by a computer, implement a process comprising the steps of:
    (a) selecting a plurality of Web sites operated by content providers and relating to a category to which the specified subject relates, wherein the plurality of Web sites is selected based on the frequency with which relevant links have been located in prior iterations of the method with respect to the specified subject;
    (b) automatically determining the relevancy of at least one Web page in each selected Web site by scanning at least one Web page for words relating to the specified subject;
    (c) automatically determining the content type of at least one Web page in each selected Web site by scanning at least one Web page for words indicating content type;
    (d) compiling a list of relevant Web pages based on the results of steps (b) and (c), wherein the list includes hyperlinks to the relevant Web pages; and
    (e) providing the compiled list to the subscriber, wherein the subscriber is a party other than one of said content providers, wherein the providing comprises transmitting the complied list from a Web server to the subscriber over the Internet.

6. A computer-readable medium tangibly embodying instructions which, when executed by a computer, implement a process comprising the steps of:
    (a) selecting a plurality of Web sites operated by content providers and relating to a category to which the specified subject relates, wherein the plurality of Web sites is selected based on the frequency with which relevant links have been located in prior iterations of the method with respect to the same category;

(b) automatically determining the relevancy of at least one Web page in each selected Web site by scanning at least one Web page for words relating to the specified subject;

(c) automatically determining the content type of at least one Web page in each selected Web site by scanning at least one Web page for words indicating content type;

(d) compiling a list of relevant Web pages based on the results of steps (b) and (c), wherein the compiled list includes hyperlinks to the relevant Web pages; and (e) providing the compiled list to the subscriber, wherein the subscriber is a party other than one of said content providers, wherein the providing comprises transmitting the complied list from a Web server to the subscriber over the Internet.

7. A computer-readable medium tangibly embodying instructions which, when executed by a computer, implement a process comprising the steps of:

(a) selecting a plurality of Web sites operated by content providers and relating to a category to which the specified subject relates;

(b) automatically determining the relevancy of at least one Web page in each selected Web site by scanning at least one Web page for words relating to the specified subject;

(c) automatically determining the content type of at least one Web page in each selected Web site by scanning at least one Web page for words indicating content type;

(d) compiling a list of relevant Web pages based on the results of steps (b) and (c) wherein the compiled list of relevant Web pages is compiled by including only those Web pages that are determined both to be relevant to step (b) and to be of a news content type in step (c), and wherein the compiled list includes hyperlinks to the relevant Web pages; and (e) providing the compiled list to the subscriber, wherein the subscriber is a party other than one of said content providers, wherein the providing comprises transmitting the complied list from a Web server to the subscriber over the Internet.

8. A computer-readable medium tangibly embodying instructions which, when executed by a computer, implement a process comprising the steps of:

(a) selecting a plurality of Web sites operated by content providers and relating to a category to which the specified subject relates;

(b) automatically determining the relevancy of at least one Web page in each selected Web site by scanning at least one Web page for words relating to the specified subject;

(c) automatically determining the content type of at least one Web page in each selected Web site by scanning at least one Web page for words indicating content type;

(d) compiling a list of relevant Web pages based on the results of steps (b) and (c), wherein the list of relevant Web pages is complied by including only those Web pages that are determined both to be relevant in step (b) and not to be advertisements in step (c), and wherein the compiled list includes hyperlinks to the relevant Web pages; and (e) providing the compiled list to the subscriber, wherein the subscriber is a party other than one of said content providers, wherein the providing comprises transmitting the complied list from a Web server to the subscriber over the Internet.

9. A system for providing news relating to a specified subject to a subscriber, comprising:

means for selecting a plurality of Web sites operated by content providers and relating to a category to which the specified subject relates, wherein the plurality of Web sites is selected based on the frequency with which relevant links have been located in prior iterations of the method with respect to the specified subject;

means for automatically determining the relevancy of at least one Web page in each selected Web site by scanning at least one Web page for words relating to the specified subject;

means for automatically determining the content type of at least one Web page in each selected Web site by scanning of at least one Web page for words indicating content type;

means for compiling a list of relevant Web pages based on the results of the scanning, wherein the compiled list includes hyperlinks to the relevant Web pages; and means for providing the compiled list to the subscriber, wherein the subscriber is a party other than one of said content providers, wherein the means for providing transmits the compiled list from a Web server to the subscriber over the Internet.

10. A system for providing news relating to a specified subject to a subscriber, comprising:

means for selecting a plurality of Web sites operated by content providers and relating to a category to which the specified subject relates, wherein the plurality of Web sites is selected based on the frequency with which relevant links have been located in prior iterations of the method with respect to the same category;

means for automatically determining the relevancy of at least one Web page in each selected Web site by scanning at least one Web page for words relating to the specified subject;

means for automatically determining the content type of at least one Web page in each selected Web site by scanning at least one Web page for words indicating content type;

means for compiling a list of relevant Web pages based on the results of the scanning, wherein the compiled list includes hyperlinks to the relevant Web pages; and means for providing the compiled list to the subscriber, wherein the subscriber is a party other than one of said content providers, wherein the means for providing transmits the compiled list from a Web server to the subscriber over the Internet.

11. A system for providing news relating to a specified subject to a subscriber, comprising:

means for selecting a plurality of Web sites operated by content providers and relating to a category to which the specified subject relates;

means for automatically determining the relevancy of at least one Web page in each selected Web site by scanning at least one Web page for words relating to the specified subject;

means for automatically determining the content type of at least one Web page in each selected Web site by scanning at least one Web page for words indicating content type;

means for compiling a list of relevant Web pages based on the results of the scanning, wherein the list of relevant Web pages is compiled by including only those Web pages that are determined both to be relevant and to be of a news content type, and wherein the compiled list includes hyperlinks to the relevant Web pages; and means for providing the compiled list to the subscriber, wherein the subscriber is a party other than one of said content providers, wherein the means for providing transmits the compiled list from a Web server to the subscriber over the Internet.

12. A system for providing news relating to a specified subject to a subscriber, comprising:

means for selecting a plurality of Web sites operated by content providers and relating to a category to which the specified subject relates;

means for automatically determining the relevancy of at least one Web page in each selected Web site by scanning at least one Web page for words relating to the specified subject;

means for automatically determining the content type of at least one Web page in each selected Web site by scanning at least one Web page for words indicating content type;

means for compiling a list of relevant Web pages based on the results of the scanning, wherein the list of relevant Web pages is compiled by including only those Web pages that are determined both to be relevant and not to be advertisements, and wherein the compiled list includes hyperlinks to the relevant Web pages; and means for providing the compiled list to the subscriber, wherein the subscriber is a party other than one of said content providers, wherein the means for providing transmits the compiled list from a Web server to the subscriber over the Internet.

13. A system for providing news relating to a specified subject to a subscriber, comprising:

a processor;

a memory connected to said processor;

a display in communication with said processor; and an input device in communication with said processor, wherein said processor selects a plurality of Web sites operated by content providers and relating to a category to which the specified subject relates, wherein the plurality of Web sites is selected based on the frequency with which relevant links have been located in prior iterations of the method with respect to the specified subject;

wherein said processor automatically determines the relevancy of at least one Web page in each selected Web site by scanning at least one Web page for words relating to the specified subject;

wherein said processor automatically determines the content type of at least one Web page in each selected Web site by scanning at least one Web page for words indicating content type;

wherein said processor compiles a list of relevant Web pages based on the results of the scanning, wherein the compiled list includes hyperlinks to the relevant Web pages;

wherein said processor transmits the compiled list from a Web server to the subscriber over the Internet; and where the subscriber is a party other than one of said content providers.

14. A system for providing news relating to a specified subject to a subscriber, comprising:

a processor;

a memory connected to said processor;

a display in communication with said processor; and an input device in communication with said processor, wherein said processor selects a plurality of Web sites operated by content providers and relating to a category to which the specified subject relates, wherein the plurality of Web sites is selected based on the frequency with which relevant links have been located in prior iterations of the method with respect to the same category;

wherein said processor automatically determines the relevancy of at least one Web page in each selected Web site by scanning at least one Web page for words relating to the specified subject;

wherein said processor automatically determines the content type of at least one Web page in each selected Web site by scanning at least one Web page for words indicating content type;

wherein said processor compiles a list of relevant Web pages based on the results of the scanning, wherein the compiled list includes hyperlinks to the relevant Web pages;

wherein said processor transmits the compiled list from a Web server to the subscriber over the Internet; and where the subscriber is a party other than one of said content providers.

15. A system for providing news relating to a specified subject to a subscriber, comprising:

a processor;

a memory connected to said processor;

a display in communication with said processor; and an input device in communication with said processor, wherein said processor selects a plurality of Web sites operated by content providers and relating to a category to which the specified subject relates;

wherein said processor automatically determines the relevancy of at least one Web page in each selected Web site by scanning at least one Web page for words relating to the specified subject;

wherein said processor automatically determines the content type of at least one Web page in each selected Web site by scanning at least one Web page for words indicating content type;

wherein said processor compiles a list of relevant Web pages based on the results of the scanning, wherein the compiled list of relevant Web pages is compiled by including only those Web pages that are determined both to be relevant and to be of a news content type, and wherein the compiled list includes hyperlinks to the relevant Web pages;

wherein said processor transmits the compiled list from a Web server to the subscriber over the Internet; and wherein the subscriber is a party other than one of said content providers.

16. A system for providing news relating to a specified subject to a subscriber, comprising:

a processor;

a memory connected to said processor;

a display in communication with said processor; and an input device in communication with said processor, wherein said processor selects a plurality of Web sites operated by content providers and relating to a category to which the specified subject relates;

wherein said processor automatically determines the relevancy of at least one Web page in each selected Web site by scanning at least one Web page for words relating to the specified subject;

wherein said processor automatically determines the content type of at least one Web page in each selected Web site by scanning at least one Web page for words indicating content type;

wherein said processor compiles a list of relevant Web pages based on the results of the scanning, wherein the compiled list of relevant Web pages is complied by including only those Web pages that are determined both to be relevant and not to be advertisements, wherein the compiled list includes hyperlinks to the relevant Web pages;

wherein said processor transmits the compiled list from a Web server to the subscriber over the Internet; and wherein the subscriber is a party other than one of said content providers.

* * * * *